United States Patent
Hepworth et al.

(10) Patent No.: US 7,185,824 B2
(45) Date of Patent: Mar. 6, 2007

(54) SYSTEM AND METHOD FOR ASSOCIATING PRE-PRINTED MACHINE-READABLE GRAPHICAL CODES WITH ELECTRONICALLY-ACCESSIBLE DATA

(75) Inventors: Paul Hepworth, Riverton, UT (US); George Powell, Sandy, UT (US)

(73) Assignee: The Code Corporation, Draper, UT (US)

( * ) Notice: Subject to any disclaimer, the term of this patent is extended or adjusted under 35 U.S.C. 154(b) by 996 days.

(21) Appl. No.: 10/103,612

(22) Filed: Mar. 21, 2002

(65) Prior Publication Data

US 2002/0149793 A1    Oct. 17, 2002

Related U.S. Application Data

(60) Provisional application No. 60/283,703, filed on Apr. 13, 2001.

(51) Int. Cl.
*G06K 19/06* (2006.01)
(52) U.S. Cl. ........................... 235/494; 235/375
(58) Field of Classification Search ................ 235/494, 235/375, 380
See application file for complete search history.

(56) References Cited

U.S. PATENT DOCUMENTS

| | | | | |
|---|---|---|---|---|
| 3,182,901 | A * | 5/1965 | Solomon | 417/372 |
| 3,513,320 | A | 5/1970 | Weldon | 250/219 |
| 4,488,679 | A | 12/1984 | Bockholt et al. | 235/469 |
| 4,654,718 | A | 3/1987 | Sueyoshi | 358/257 |
| 4,752,675 | A | 6/1988 | Zetmeir | 235/375 |
| 4,896,029 | A | 1/1990 | Chandler et al. | 235/494 |
| 4,958,064 | A | 9/1990 | Kirkpatrick | 235/384 |
| 4,998,010 | A | 3/1991 | Chandler et al. | 235/494 |
| 5,047,614 | A | 9/1991 | Bianco | 235/385 |

(Continued)

FOREIGN PATENT DOCUMENTS

EP    0837406 A2    4/1998

(Continued)

OTHER PUBLICATIONS

"Punched Cards to Bar Codes," Benjamin Nelson, Helmers Publishing, Inc. 1997, pp. 1-16.

(Continued)

*Primary Examiner*—Karl D. Frech
(74) *Attorney, Agent, or Firm*—Madson & Austin

(57) ABSTRACT

A method is disclosed for associating pre-printed machine-readable graphical codes with electronically-accessible data. An arbitrary sequence of reference identifiers is generated. Machine-readable graphical codes for the reference identifiers are generated. Labels are then printed that include the machine-readable graphical codes to provide pre-printed machine-readable graphical-code labels. In using the labels, the user places one of the pre-printed machine-readable graphical-code labels on an object and scans the label using a graphical code reading device in electronic communication with a computing device. The computing device receives graphical code data and determines a reference identifier of the graphical code data. A database is then accessed for the reference identifier. If the reference identifier did not already have an associated data specifier in the database, then electronically-accessible data is associated with the reference identifier. If the reference identifier already had an associated data specifier, the electronically-accessible data identified by the data specifier is accessed.

21 Claims, 7 Drawing Sheets

U.S. PATENT DOCUMENTS

| | | | |
|---|---|---|---|
| 5,113,445 A | 5/1992 | Wang | |
| 5,153,418 A | 10/1992 | Batterman et al. | 235/494 |
| 5,159,635 A | 10/1992 | Wang | |
| 5,189,292 A | 2/1993 | Batterman et al. | 235/494 |
| 5,223,701 A | 6/1993 | Batterman et al. | 235/494 |
| 5,343,028 A | 8/1994 | Figarella et al. | 235/462 |
| 5,352,878 A | 10/1994 | Smith et al. | 235/462 |
| 5,412,196 A | 5/1995 | Surka | 235/462 |
| 5,428,211 A | 6/1995 | Zheng et al. | 235/462 |
| 5,438,188 A | 8/1995 | Surka | 235/462 |
| 5,465,291 A | 11/1995 | Barrus et al. | 379/67 |
| 5,478,999 A | 12/1995 | Figarella et al. | 235/462 |
| 5,483,052 A | 1/1996 | Smith, III et al. | 235/472 |
| 5,493,105 A | 2/1996 | Desai | 235/375 |
| 5,545,887 A | 8/1996 | Smith et al. | 235/462 |
| 5,604,640 A | 2/1997 | Zipf et al. | 359/803 |
| 5,612,527 A | 3/1997 | Ovadia | 235/383 |
| 5,804,803 A | 9/1998 | Cragun et al. | 235/375 |
| 5,835,615 A | 11/1998 | Lubow et al. | |
| 5,850,080 A | 12/1998 | Herzig | |
| 5,853,252 A | 12/1998 | Wright et al. | |
| 5,869,819 A | 2/1999 | Knowles et al. | 235/375 |
| 5,880,451 A * | 3/1999 | Smith et al. | 235/462.1 |
| 5,903,729 A | 5/1999 | Reber et al. | 395/200.49 |
| 5,905,248 A | 5/1999 | Russell et al. | 235/462 |
| 5,905,251 A | 5/1999 | Knowles | 235/472.01 |
| 5,929,429 A * | 7/1999 | Petrie | 235/494 |
| 5,933,634 A | 8/1999 | Enokido et al. | |
| 5,933,829 A | 8/1999 | Durst et al. | 707/10 |
| 5,938,726 A | 8/1999 | Reber et al. | 709/217 |
| 5,938,727 A | 8/1999 | Ikeda | |
| 5,978,773 A | 11/1999 | Hudetz et al. | 705/23 |
| 5,984,193 A | 11/1999 | Uhling | |
| 5,992,752 A | 11/1999 | Wilz, Sr. et al. | 235/472.01 |
| 6,012,102 A | 1/2000 | Shachar | 710/5 |
| 6,027,024 A | 2/2000 | Knowles | 235/472.01 |
| 6,032,195 A | 2/2000 | Reber et al. | 709/245 |
| 6,068,188 A | 5/2000 | Knowles | 235/462.01 |
| 6,076,733 A | 6/2000 | Wilz, Sr. et al. | 235/462.01 |
| 6,098,106 A | 8/2000 | Philyaw et al. | |
| 6,108,656 A | 8/2000 | Durst et al. | 707/10 |
| 6,131,807 A * | 10/2000 | Fukuda et al. | 235/494 |
| 6,138,151 A | 10/2000 | Reber et al. | 709/219 |
| 6,154,738 A | 11/2000 | Call | 707/4 |
| 6,247,646 B1 | 6/2001 | Iwaguchi et al. | |
| 6,327,395 B1 * | 12/2001 | Hecht et al. | 382/306 |
| 6,377,986 B1 | 4/2002 | Philyaw et al. | |
| 6,384,744 B1 | 5/2002 | Philyaw et al. | |
| 6,535,883 B1 | 3/2003 | Le et al. | |
| 6,564,249 B2 | 5/2003 | Shiigi | |
| 6,584,601 B1 | 6/2003 | Kodosky et al. | |
| 6,601,772 B1 * | 8/2003 | Rubin et al. | 235/494 |
| 6,834,803 B2 | 12/2004 | Schuessler | |
| 2002/0147743 A1 | 10/2002 | Le et al. | |
| 2003/0088643 A1 | 5/2003 | Shupps et al. | |

FOREIGN PATENT DOCUMENTS

| | | |
|---|---|---|
| WO | WO98/03923 | 1/1998 |
| WO | WO98/06055 | 2/1998 |
| WO | WO98/24036 | 6/1998 |
| WO | WO98/40823 | 9/1998 |
| WO | WO98/49813 | 11/1998 |
| WO | WO99/04326 | 1/1999 |

OTHER PUBLICATIONS

"MiniCode," http://www.omniplanar.com/minicode.html, pp. 1-10, May 17, 1999.

* cited by examiner

SYSTEM AND METHOD FOR ASSOCIATING PRE-PRINTED MACHINE-READABLE GRAPHICAL CODES WITH ELECTRONICALLY-ACCESSIBLE DATA

RELATED APPLICATIONS

This application is related to and claims priority from U.S. patent application Ser. No. 60/283,703 filed Apr. 13, 2001, for "System and Method for Associating Pre-Printed Machine-Readable Graphical Codes with Electronically-Accessible Data," with inventors Paul Hepworth and George Powell, which is incorporated herein by reference.

BACKGROUND OF THE INVENTION

1. Field of the Invention

The present invention relates generally to the field of graphical-code reading computer systems. More specifically, the present invention relates to a system and method for associating pre-printed machine-readable graphical codes with electronically-accessible data on a computer system.

2. Description of Related Background Art

Computer technology has entered many areas to simplify manual tasks and to make information more readily available. Most people use several computer-related products every day that greatly simplify their work day. In addition, through the use of a computer, vast amounts of information are readily available. Computer software and electronic information sources are typically found on storage media or storage devices such as hard drives, CD-ROMs, DVD-ROMs, etc., on a local computer, on a local computer network or a global computer network, such as the Internet.

Computer programs can be used for many purposes including assisting a person in performing his or her job. For example, word processors help computer users prepare documents, spreadsheet programs help users perform accounting functions and numerical analysis, diagnostic programs assist users in diagnosing problems, etc. There are many programs available to help users with almost any need they may have. Generally, computer programs need some type of manual input to help a user, from simply starting the program to entering a significant amount of input.

Before a user can access relevant electronic information, he or she usually needs to enter some input before helpful information becomes available. By way of example, many computer users, when looking for particular information, will use the World Wide Web (the "Web") to find information. Typically users will begin their search for information by using a search engine on the Web. To perform a search, a user first enters one or more search terms. Typically, a user will then browse the results by clicking on various links and reading through the information found. After some manual browsing, the user often finds the relevant information. Finding and accessing electronic information from a CD-ROM or from a hard drive is similar in that some manual searching and browsing of data is required.

Usually computer programs and/or electronic information relates to a particular product, item or task. As illustrated, the computer user often needs to provide input to use the program or to access the information. For example, the particular product, item or task may require a user to start a particular computer program, access certain electronic information, enter particular input using the keyboard or mouse, complete an online form, etc.

Machine-readable graphical codes may be inserted into printable documents or printed on labels that can be affixed to objects. Generally, the codes store a reference identifier that links the document or object to associated data such as product information, documents, status data, web pages, inventory, etc. Typically the reference identifier is associated with data either before or at about the same time as the graphical code is generated for the document or object. The use of these machine-readable graphical codes may greatly simplify the actions required of a user to access relevant information.

Software is available that enables a user to find and display electronically-accessible data associated with a reference identifier of some kind (e.g., identified when one of these graphical codes is scanned). Examples of such software and systems include (a) point-of-sale systems that retrieve product information from bar codes on the products, (b) library systems that check books out/in using bar codes on the books, (c) automobile service data systems that display service history when the vehicle identification number is entered, (d) Internet web servers that deliver web pages when a URL is entered, etc.

As mentioned above, graphical codes (e.g., bar codes) may be used to identify electronically-accessible information, programs, etc. Special software, fonts and/or printers are often needed to print the graphical codes. In addition, one or more special computer programs are needed to associate data with the references stored in the graphical codes.

Systems exist to print labels with unique identifiers. Many of these systems can print labels containing graphical codes efficiently and in large quantities. With these systems, typically blank labels are provided by the sheet or by the roll. Using a printer, the system prints graphical codes on the blank labels. Each of these graphical codes usually corresponds to a unique identifier. The unique identifiers used may be sequential numbers or any other desired sequence or character.

Some users find that it is inconvenient to assign reference identifiers and associate them with data. In addition, many documents and objects do not have an intrinsic reference number (such as a part number or serial number) associated with them. Out of the items that do have intrinsic reference numbers, many use identifiers that are too long to be stored in a graphical code of the desired size or use characters not supported by the graphical code symbology. When no intrinsic identifier is available, some type of identifier needs to be created for the graphical code. For example, a user may generate a sequence of identifiers and a log of their assignment to track inventory, products, etc.

It would be beneficial if means were provided to enable a user to more easily use graphical codes to access electronically-accessible data. In addition, it would be desirable to achieve this in a more automated way requiring less user input.

BRIEF DESCRIPTION OF THE DRAWINGS

Non-exhaustive embodiments of the invention are described with reference to the figures, in which.

DETAILED DESCRIPTION

Figure 1:
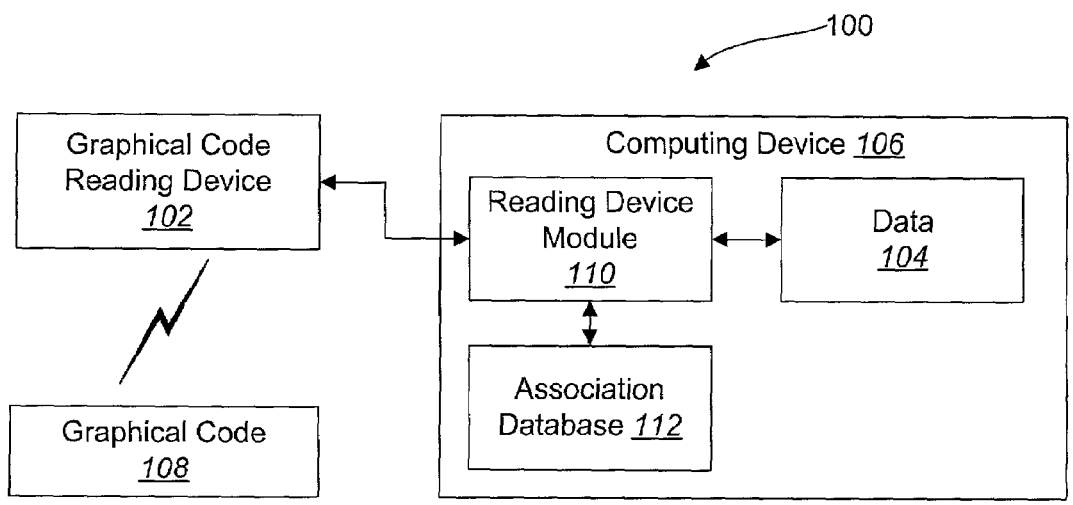
FIG. 1 is a block diagram of an embodiment of a system for associating pre-printed machine-readable graphical codes with electronically-accessible data.

A method is disclosed for associating pre-printed machine-readable graphical codes with electronically-accessible data. An arbitrary sequence of reference identifiers is generated. Machine-readable graphical codes for the sequence of reference identifiers are generated. Labels are then printed that include the machine-readable graphical codes to provide pre-printed machine-readable graphical-code labels. An end user may obtain and use the pre-printed machine-readable graphical-code labels. In using the labels, the user places one of the pre-printed machine-readable graphical-code labels on an object and later scans the label using a graphical code reading device in electronic communication with a computing device. The computing device receives graphical code data and determines a reference identifier of the graphical code data. A database is then accessed for the reference identifier. If the reference identifier did not already have an associated data specifier in the database (which will be the case the first time), then electronically-accessible data is associated with the reference identifier (described later). If the reference identifier already had an associated data specifier, the electronically-accessible data identified by the data specifier is accessed.

In embodiments disclosed herein, the electronically-accessible data may be dynamically associated with the reference identifier by providing to the user a chooser to select a file, a program, or a record in a database system. The reference identifier may be unrelated to the electronically-accessible data. In addition, a field may be provided to the user for entering user input, such as an address of a web page (i.e., a URL). Moreover, the electronically-accessible data may be associated with the reference identifier by providing to the user a drag-and-drop interface.

The data specifier identifies the electronically-accessible data. The data specifier may be a filename, a program name and arguments, a URL, etc. New electronically-accessible data may be associated with the reference identifier by providing a change interface to a user whereby the data specifier may be changed. The electronically-accessible data may be stored on the computing device or it may be stored remotely from the computing device.

A system is also disclosed for dynamically associating pre-printed machine-readable graphical codes with electronically-accessible data. The system includes a graphical code reading device that scans a pre-printed machine-readable graphical code and provides graphical code data. The graphical code reading device is in electronic communication with a computing device that receives the graphical code data from the graphical code reading device. The computing device includes a processor, memory and a communications port in electronic communication with the processor for communicating with the graphical code reading device. A database is also used on the computing device for storing a plurality of reference identifiers and for storing a plurality of data specifiers.

A driver may be used on the computing device that receives graphical code data and determines a reference identifier of the graphical code data. The reference identifier is predetermined by a pre-printed machine-readable graphical-code label provider and is part of a sequence of reference identifiers. A database is then accessed for the reference identifier. If the reference identifier did not already have an associated data specifier in the database, then a user interface is provided to associate the electronically-accessible data with the reference identifier. If the reference identifier already had an associated data specifier, the electronically-accessible data identified by the data specifier is accessed. If the data does not already exist, the user may be prompted to create the data. For example, a new inventory record in a database management system could be created, and the user may be presented with a form to fill in information relating to the object that was scanned.

Another method is disclosed for accessing electronically-accessible data through the use of a pre-printed machine-readable graphical code. A pre-printed machine-readable graphical code unrelated to the electronically-accessible data is provided. The pre-printed machine-readable graphical code corresponds to a reference identifier. The pre-printed machine-readable graphical-code is dynamically assigned to an object. The pre-printed machine-readable graphical-code is then scanned by a graphical code reading device and graphical code data corresponding to the code is communicated to a computing device. A reference identifier of the graphical code data is determined. Electronically-accessible data is dynamically associated with the reference identifier by assigning a data specifier to the reference identifier and storing the data specifier in the database with the reference identifier.

After having associated the electronically-accessible data with the reference identifier, the pre-printed machine-readable graphical-code is then scanned at a later time. Graphical code data from a graphical code reading device is sent to the computing device. The reference identifier of the graphical code data is determined. Using the reference identifier, the data specifier is retrieved from the database. The electronically-accessible data identified by the data specifier is then accessed.

Referring now to FIG. 1, there is shown an embodiment of a system 100 for associating pre-printed machine-readable graphical codes 108 with electronically-accessible data 104. The computing device 106 is in electronic communication with the graphical code reading device 102. The graphical code reading device 102 scans a graphical code 108 to obtain or provide graphical code data to the computing device 106. Various types of graphical codes 108 may be used with systems and methods herein. For example, bar codes or matrix codes may be used as graphical codes 108. Of course, any other graphical code 108 that may be scanned may be used with embodiments herein.

The graphical code reading device 102 may be connected to or integrated with the computing device 106. If the graphical code reading device 102 is connected to the computing device 106, the connection may be wireless or wired, or may be continuous or intermittent.

The computing device 106 shown in FIG. 1 may be a personal computer, a Palm computer, a PDA, a game machine, a cell phone, etc. These computing devices are commercially available and known by those skilled in the art. Components typically found in a computing device 106 will be discussed below in relation to FIG. 7.

In operation, a reading device module 110 receives the graphical code data from the graphical code reading device 102 and accesses the electronically-accessible data 104 that has been associated with the graphical code data. If no electronically-accessible data 104 has been specified, the reading device module 110 associates the graphical code data with electronically-accessible data. An association database 112 may be used to store associations of graphical codes 108 with electronically-accessible data 104. The association database 112 will be more fully discussed below. Generally, the association database 112 includes a list of the graphical code data that may be received from the graphical code reading device 102 along with any electronically-accessible data that has been associated with the graphical code data.

The electronically-accessible data 104 is any data that may be used by the reading device module 110 in some way that is related to a graphical code 108. For example, the electronically-accessible data 104 may be folders, directories, files, web pages, computer programs, database records, etc. The data 104 may be stored locally on the computing device 106. In addition, and as will be shown below, the data 104 may be stored remotely, such as on a local area network, a wide area network, the Internet, etc.

The reading device module 110 includes the instructions that receive the graphical code data from the graphical code reading device 102, access the database 112 and then access the electronically-accessible data 104. Of course, the reading device module 110 may be embodied in one component or file, or it may include several separate components. For example, the reading device module 110 may simply be an application, a library, multiple libraries, several interacting applications, a driver, several drivers, etc. Thus, the term reading device module 110 broadly refers to the functionality associated with this module 110 and is not meant to limit the scope of this term to one standalone component, although the module 110 may be implemented as one standalone component.

It will be appreciated by those skilled in the art that the inventive principles herein may be applied and implemented in a wide variety of ways. Different examples of such implementations will be shown through embodiments herein to illustrate the versatility of the present invention and that it may be used in many different embodiments all within the scope of the present invention.

Figure 2:
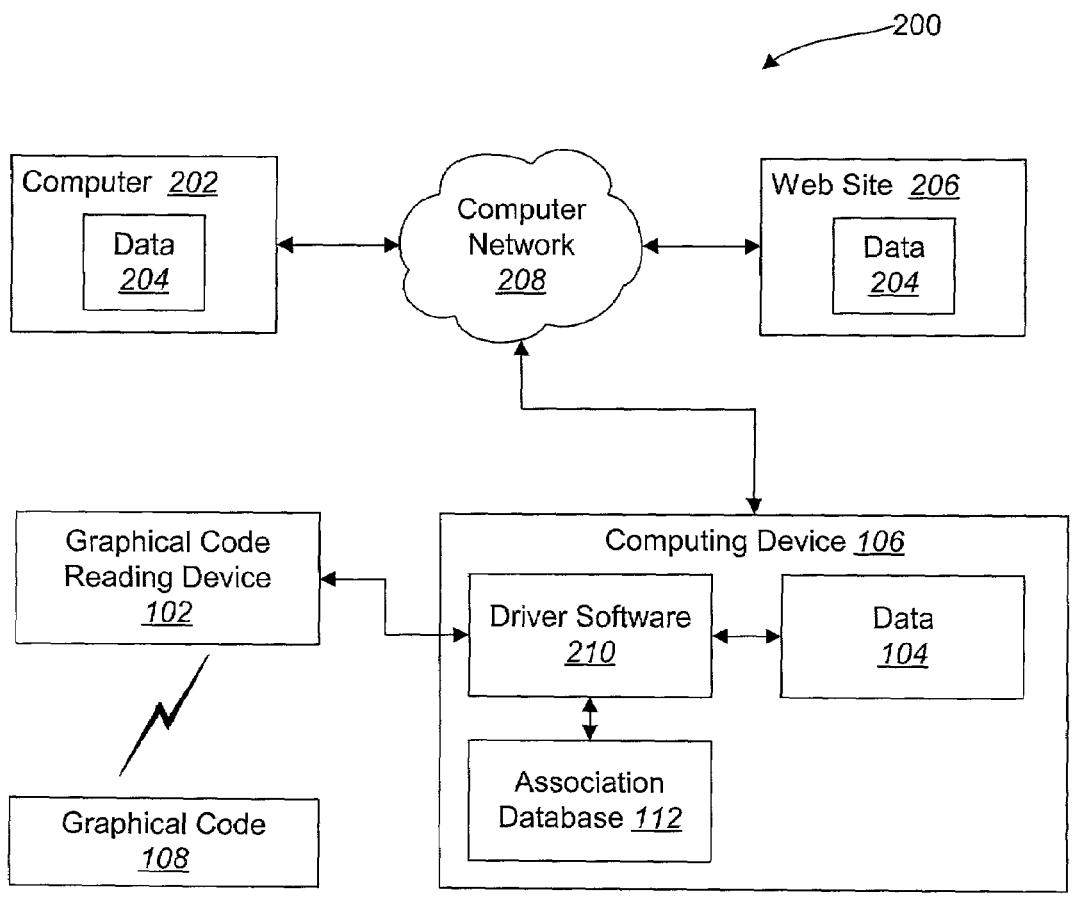
FIG. 2 is a block diagram of another embodiment of a system for associating pre-printed machine-readable graphical codes with electronically-accessible data.

FIG. 2 illustrates an embodiment 200 where the reading device module 110 is embodied in driver software 210 and where the data 104, 204 may be stored remotely. In the embodiment 200 shown in FIG. 2, the driver software 210 receives the graphical code data from the graphical code reading device 102. The driver software 210 then accesses the electronically-accessible data 104 that has been associated with the graphical code data. If no electronically-accessible data 104 has been specified for the graphical code data, the driver software 210 associates the graphical code data with electronically-accessible data 104.

The electronically-accessible data 104 may be stored on the computing device 106, or it may be stored remotely. FIG. 2 illustrates data 204 being stored on a computer 202 across a computer network 208. Data 204 may also be stored on or in combination with a web site 206. When the driver software 210 receives the graphical code data, the association database 112 may link the graphical code data to local data 104 or to data 204 sources over the computer network 208. There are commercially available systems and components that may be used to communicate over computer networks 208 to access data or information.

Figure 3:
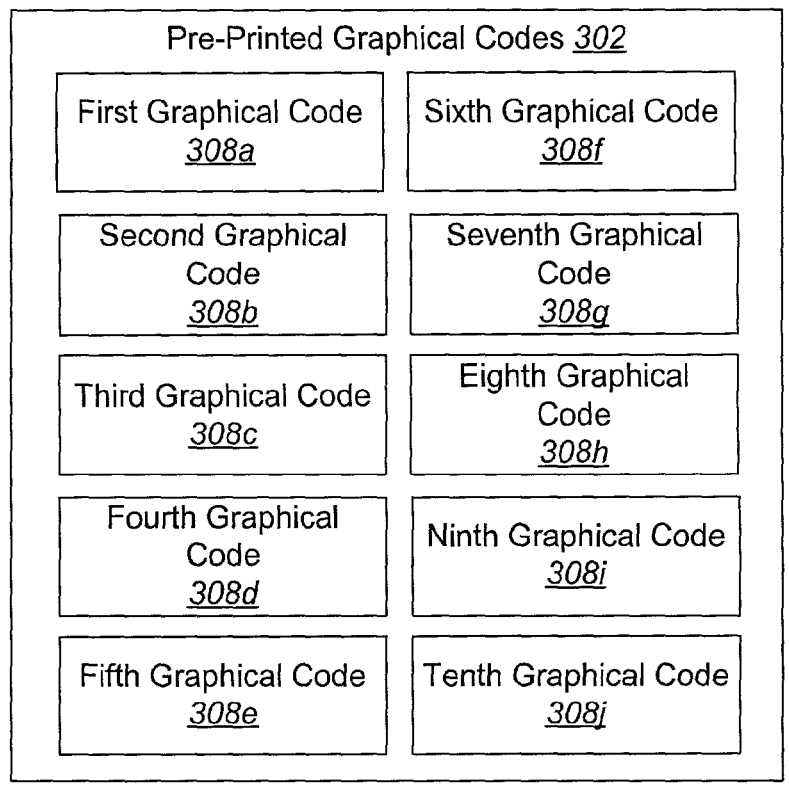
FIG. 3 illustrates an embodiment of multiple pre-printed graphical codes.

Referring now to FIG. 3, pre-printed graphical codes may be used with embodiments herein. Pre-printed graphical codes have already had reference identifiers assigned for each of the graphical codes, and, as a result, an end user of the pre-printed graphical codes may use the already assigned reference identifiers. In addition, the end user does not need special software, fonts, printers, etc., to print the graphical codes because they have already been printed in a usable form. One such usable form is a pre-printed graphical code 302 sheet of graphical code labels 308. Each label 308 may be removed from the label sheet 302 and placed on a product or item. Pre-printed graphical codes may also be provided in rolls of labels 308. Those skilled in the art will appreciate the various ways in which pre-printed graphical codes 108 may be provided to end users.

To use the sheet 302 of labels 308, an end user simply obtains the labels 308 and, as needed, removes a label 308 from the sheet 302 and places it on whatever item he or she wishes to use with the label 308. Because the graphical codes 308 already have a reference identifier encoded in the code 308, the user does not need to keep a record of what graphical code 308 was placed on which object or item. However, to enable the user to manually record the graphical code 308 used with an item, the reference identifier may be included in a human-readable form as well as in the graphical code format.

Figure 4:
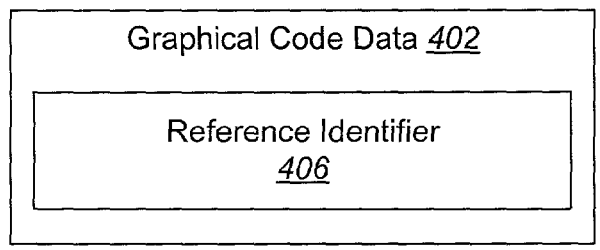
FIG. 4 is a block diagram of an embodiment of graphical code data.

FIG. 4 illustrates a block diagram of an embodiment of graphical code data 402. Graphical code data 402 corresponds to the graphical code 108 and is typically communicated from the graphical code reading device 102 to the computing device 106. The graphical code data 402 includes a reference identifier 406. The reference identifier 406 is used to identify the graphical code data 402 so that a particular graphical code 108 may be associated with electronically-accessible data. Many different types of numbering schemes may be used for the reference identifiers 406. For example, sequential numbers may be used as the reference identifiers 406 for a series of graphical code data 402 encoded in the graphical codes 108. The reference identifiers 406 may be used by an end user to track products, inventory, etc.

Figure 5:
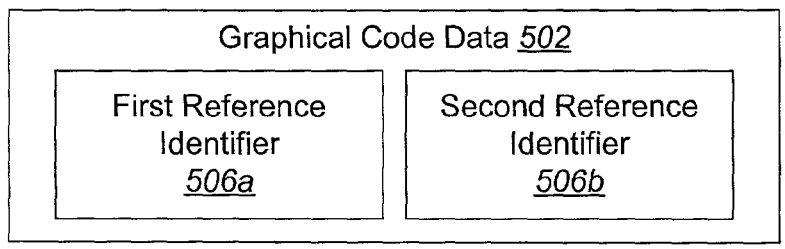
FIG. 5 is a block diagram of another embodiment of graphical code data.

Those skilled in the art will appreciate that graphical code data 402 may be in different formats and contain various pieces of information. For example, and as shown in FIG. 5, graphical code data 502 may include two reference identifiers 506, a first reference identifier 506a and a second reference identifier 506b. Some end users may find multiple reference identifiers 506 useful. For example, in one use of the graphical code data 502 of FIG. 5, the first reference identifier 506a may be used by the end user to identify a type of product and the second reference identifier 506b may be used to identify the inventory of that particular product.

Figure 6:
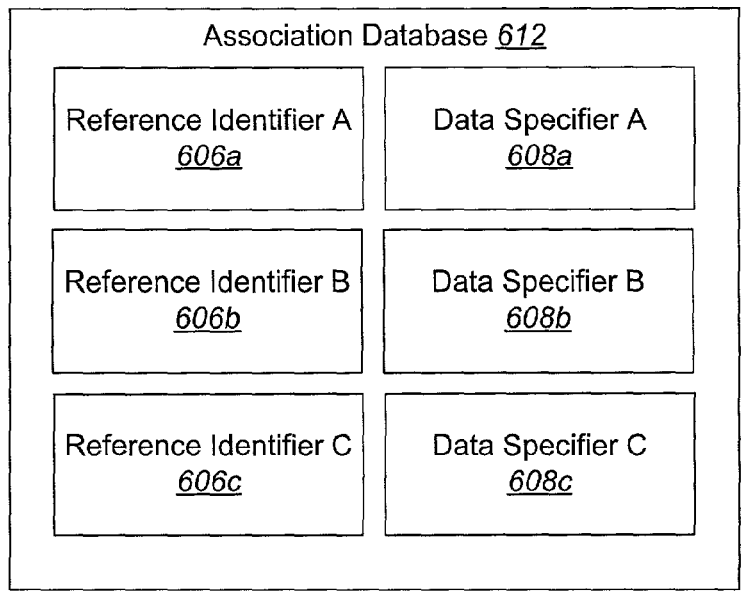
FIG. 6 is a block diagram of an embodiment of an association database.

Referring now to FIG. 6, the association database 612 may have different formats. The association database 612 may include a number of reference identifiers 606 and their associated data specifiers 608. Reference identifiers 606 and data specifiers 608 may be added, modified and/or removed from the association database 612.

Many different means may be used to implement the association database 612. For example, a simple text file may be used, multiple files may be used, commercial databases may be used, etc., to implement the association database 612. The illustration of FIG. 6 is only meant to illustrate that reference identifiers 606 and data specifiers 608 are stored in the database 612 but is not meant to limit the format or the particular embodiment of the database 612.

As indicated above, many different types of identification schemes may be used for the reference identifiers 606. One example of possible reference identifiers 606 that can be used is the following: 0001, 0002, 0003, 0004, 0005, 0006, 0007, etc. Another example of possible reference identifiers is 000a, 000b, 000c, 000d, etc. Random identifiers may also be used, such as 135903, 690, 125940, 234, etc. It will be appreciated that many different identifications and schemes may be used to create reference identifiers 606.

The data specifier 608 identifies the electronically-accessible data. The data specifier may be a filename, a program name and any arguments, a URL, a database record, or any other piece of data that can be used to identify electronically-accessible data.

Figure 7:
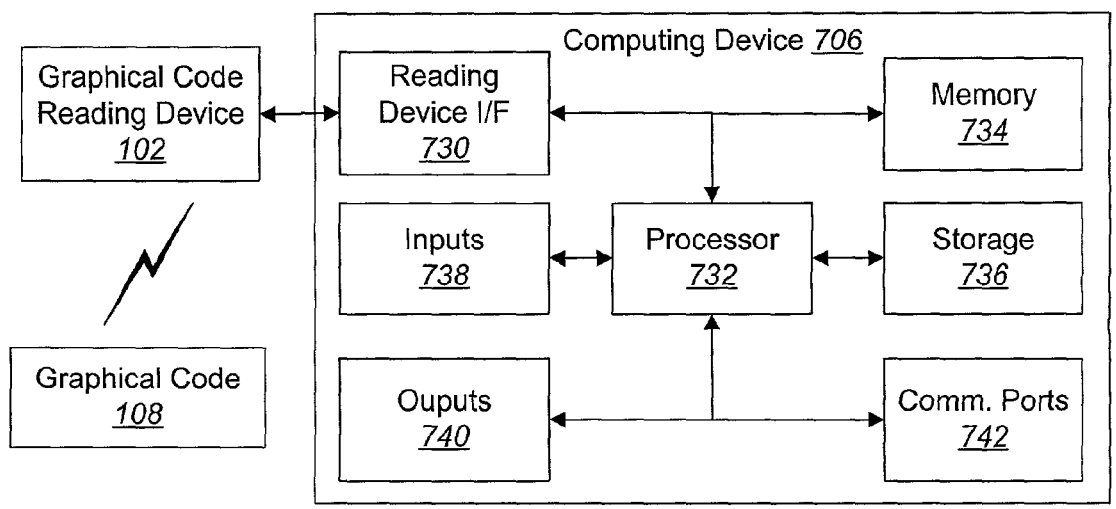
FIG. 7 is a block diagram of hardware components that may be used in an embodiment of a computer.

FIG. 7 is a block diagram of hardware components that may be used in an embodiment of a computing device 706 used in combination with the graphical code reading device 102. The computing device 706 is used in combination with the graphical code reading device 102 to read in the graphical codes 108 and to associate the pre-printed graphical codes 108 with electronically-accessible data 104. The embodiment of the computing device 706 shown in FIG. 7 communicates with the graphical code reading device 102 through the reading device interface 730. The reading device interface 730 may be a standard communications port typically found on a computing device 706, or it may be a specialized interface card provided along with the graphical code reading device 102.

Many different types of computing devices may be used to implement the computing device 706 illustrated herein. The diagram of FIG. 7 illustrates typical components of a computing device 706 including a processor 732, memory 734, a storage device 736, an input device 738, and an output device 740.

One or more communication ports 742 may also be included in the computing device 706. It will be appreciated by those skilled in the art that more components may be included in the computing device 706. For example, several input devices 738 may be included, such as a keyboard, a mouse, a joystick, a touch screen, etc. In addition, several output devices 740 may be included such as a monitor, speakers, a printer, etc. Thus, those skilled in the art will appreciate that additional components may be added to the computing device 706 without detracting from the functionality to serve as a computing device 706.

The computing device 706 may be a conventional desktop computer. Desktop computers are commercially available. However, it will be appreciated by those skilled in the art that the computing device 706 is a broadly defined digital computer. A computing device 706, as used herein, is any device that includes a digital processor capable of receiving and processing data. A computing device 706 includes the broad range of digital computers including microcontrollers, embedded computer systems, hand-held computers, personal computers, servers, mainframes, supercomputers, and any variation or related device thereof.

Figure 8:
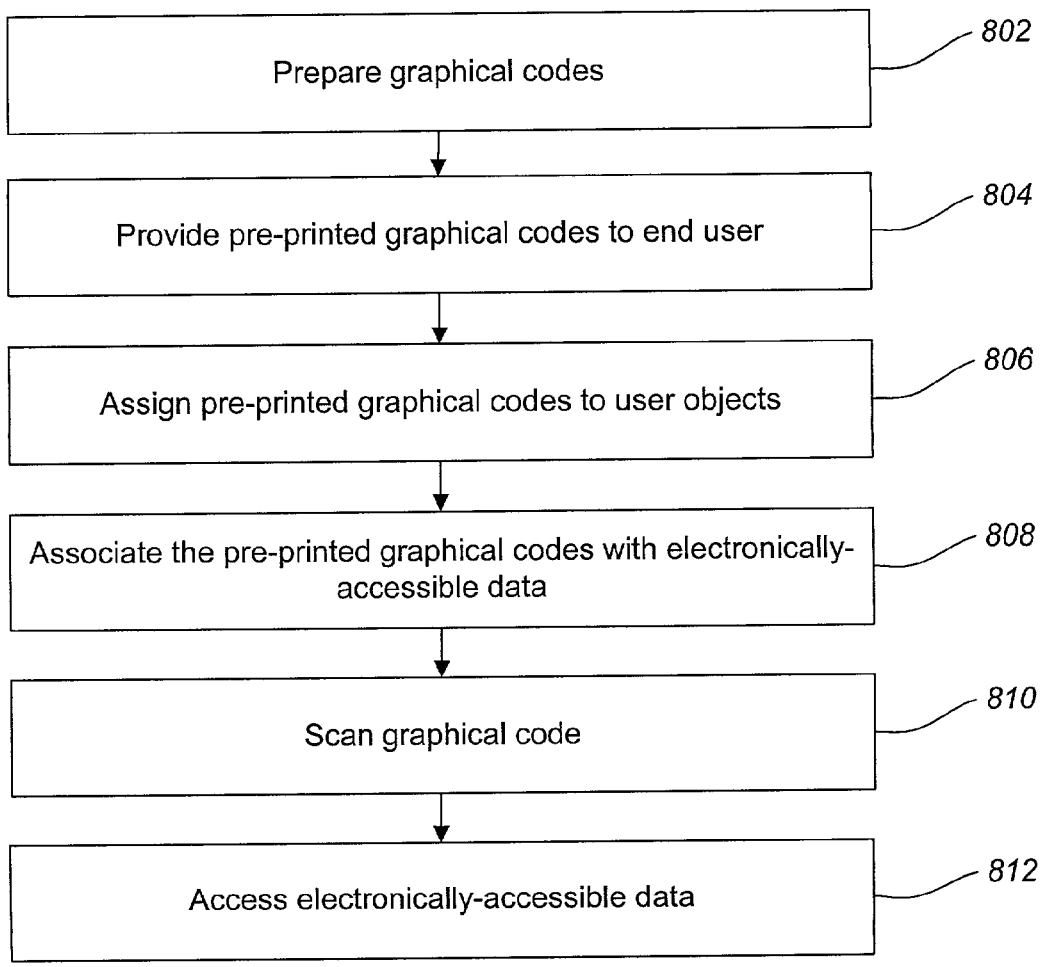
FIG. 8 is a flow diagram of an embodiment of a method for using pre-printed machine-readable graphical codes with electronically-accessible data.

FIG. 8 illustrates an embodiment of a method for using pre-printed machine-readable graphical codes with electronically-accessible data. The machine-readable graphical codes are prepared 802 by a graphical-code provider which may be a third party. The pre-printed machine-readable graphical codes are then provided 804 to an end user. The end user assigns 806 the pre-printed machine-readable graphical codes to user objects. User objects are whatever items the user desires to use with the pre-printed machine-readable graphical codes. For example, the user objects may be products, documents, property, etc. The user associates 808 the pre-printed machine-readable graphical codes with electronically-accessible data 104. Finally, when the pre-printed machine-readable graphical codes are scanned 810, electronically-accessible data 104 is automatically accessed 812 by the computing device 106.

Figure 9:
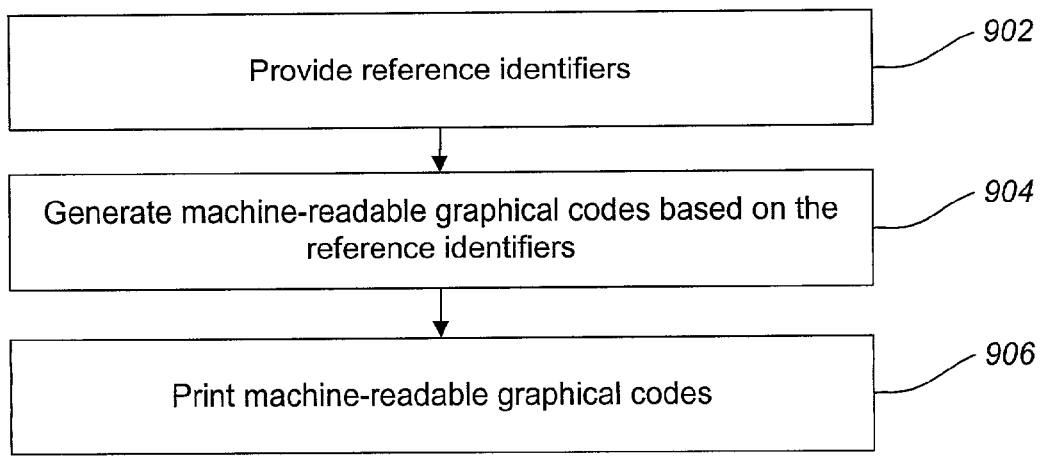
FIG. 9 is a flow diagram of an embodiment of a method for preparing pre-printed machine-readable graphical codes.

FIG. 9 illustrates an embodiment of a method for preparing 802 pre-printed machine-readable graphical codes. A graphical code provider generates 902 or is provided with a sequence of reference identifiers 406. Because the graphical codes are printed before knowing the exact use of the codes, and to enhance the versatility of the pre-printed graphical codes, the reference identifiers 406 may not be related or oriented toward a specific product or products. In addition, the reference identifiers 406 may be a sequence of numbers. Machine-readable graphical codes are then generated 904 based on the reference identifiers such that when the machine-readable graphical codes are scanned, the reference identifiers are obtained by the computing device 106. Finally, the machine-readable graphical codes are printed 906 so that they may be distributed and used by end users of the pre-printed machine-readable graphical codes. The machine-readable graphical codes may be printed on labels, on sheets of labels, on rolls of labels, etc.

Once the machine-readable graphical codes are prepared 802 by a graphical code provider, they are then provided 804 to an end user. Typically an end user will purchase the pre-printed machine-readable graphical codes at a store, order them from the provider online, etc.; although a user may print his own. The end user then assigns 806 the pre-printed machine-readable graphical codes to user objects. As stated, user objects are whatever items the user desires to use with the pre-printed machine-readable graphical codes, such as products, documents, property, etc. To assign 806 a pre-printed machine-readable graphical code to a user object the user usually simply places the label on the object. Of course, the user may assign 806 the code to an object in a different manner.

Figure 10:
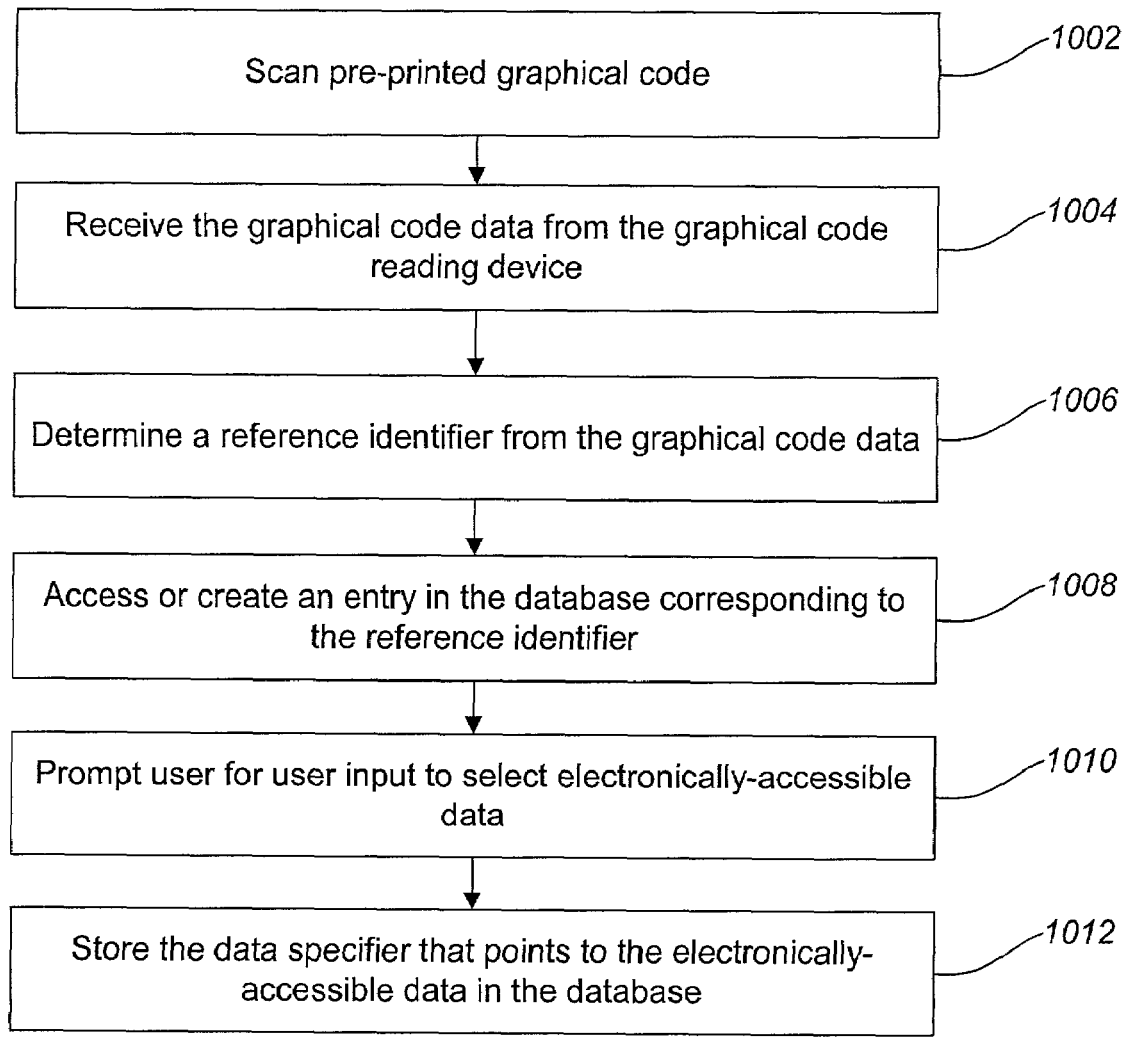
FIG. 10 is a flow diagram of an embodiment of a method for associating the pre-printed machine-readable graphical codes with electronically-accessible data.

FIG. 10 illustrates an embodiment of a method for associating 808 the pre-printed machine-readable graphical codes with electronically-accessible data 104. A user scans 1002 a pre-printed machine-readable graphical code that has been assigned to an object. The computing device 106 receives 1004 the graphical code data from the graphical code reading device. The reading device module 110 or driver software 210 determines 1006 a reference identifier from the graphical code data. The device module 110 or driver software 210 then attempts to access 1008 an entry in the database 112 that corresponds to the reference identifier. If no entry is in the database 112 that corresponds to the reference identifier, an entry is created 1008.

The user is prompted 1010 through a user interface to select electronically-accessible data so that it can be associated with the reference identifier. Those skilled in the art will appreciate the many different ways in which a user can be prompted to identify data. For example, a chooser window may be displayed to the user to allow the user to select a particular file or program on the computer, on the network 208 or to browse to a web page, etc. Alternatively, the user may be presented with a field for manually entering a file name, a URL, a path, etc. Another possible way for the user to select electronically-accessible data is to present a user with a drag and drop interface where he or she may simply drag the source of data onto the selection window. Once the new electronically-accessible data has been identified, the device module 110 or driver software 210 stores 1012 the data specifier 608 that points to the electronically-accessible data 104 in the database 112. Once the electronically-accessible data 104 has been associated with the reference identifier 406 and stored in the database 112, a user will be able to automatically access the data 104 the next time the graphical code 108 is scanned.

Figure 11:
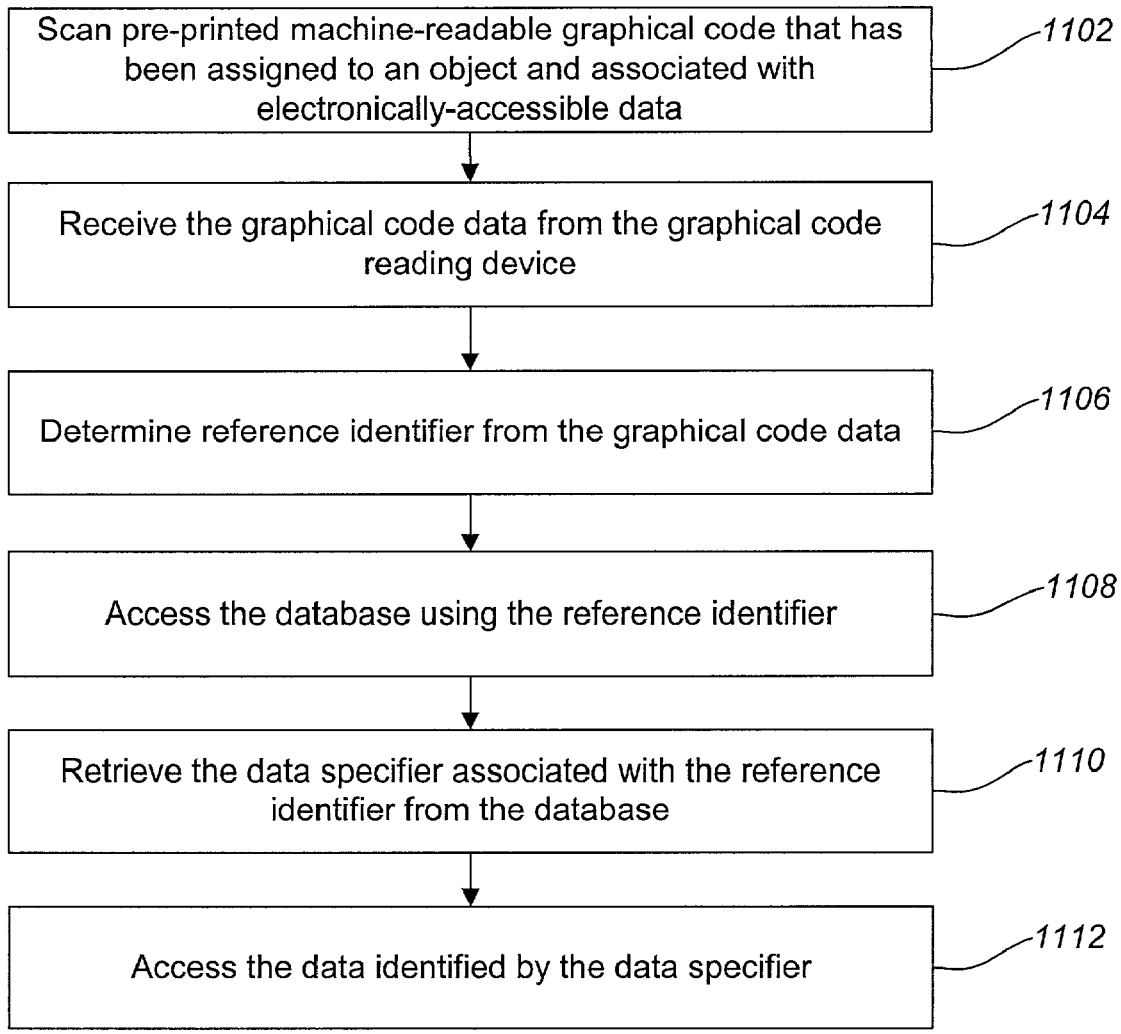
FIG. 11 is a flow diagram of an embodiment of a method for automatically accessing electronically-accessible data when a pre-printed machine-readable graphical code is scanned.

FIG. 11 illustrates an embodiment of a method for automatically accessing electronically-accessible data 104 when the pre-printed machine-readable graphical codes are scanned. A user scans 1102 a pre-printed machine-readable graphical code that has been assigned to an object and associated with electronically-accessible data 104. The computing device 106 receives 1104 the graphical code data from the graphical code reading device 102. The reading device module 110 or driver software 210 determines 1106 a reference identifier from the graphical code data. The device module 110 or driver software 210 then accesses 1108 the database 112 using the reference identifier and retrieves 1110 the data specifier 608 and then accesses 1112 the data 104 identified by the data specifier 608.

The data 104 may be accessed in various ways, depending on what kind of data source it is. For example, the driver 210 may allow the operating system to determine how the data 104 is to be opened or accessed. Thus, if the data 104 is a Microsoft Word document, accessing the data 104 may cause Microsoft Word to be started with the data 104 file opened. If the data 104 is a web page, the operating system may cause the default browser to open the data 104 web page. If the data 104 is an executable program, the driver 210 or operating system may execute the data 104 program. If the data is a record in a database management system, the driver may request that the database management system display the record. As shown, there are a variety of ways in which the data 104 may be accessed.

Figure 12:
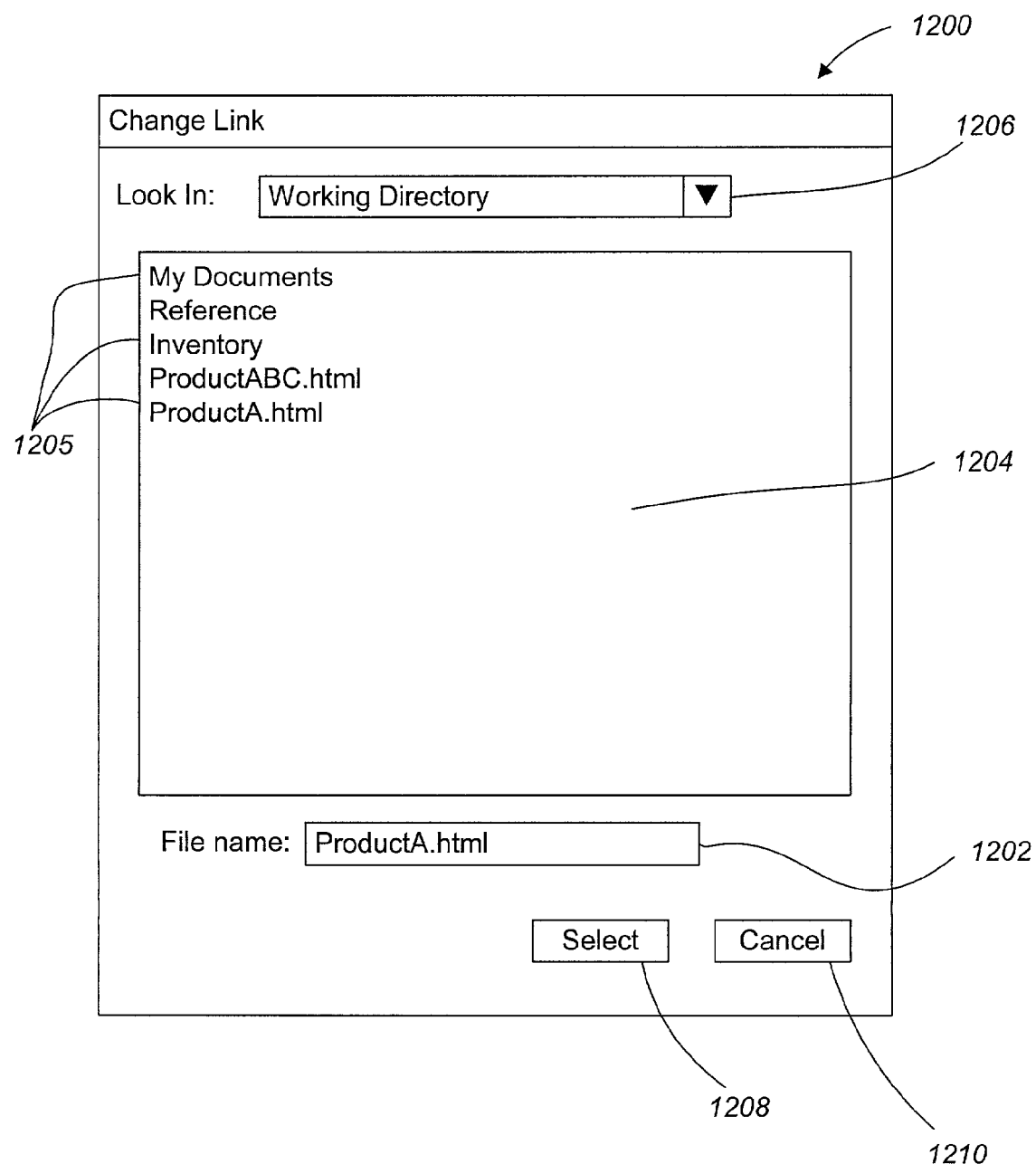
FIG. 12 illustrates an embodiment of a user interface for changing the association of electronically-accessible data with a pre-printed machine-readable graphical code.

FIG. 12 illustrates an embodiment of a user interface 1200 for changing the link to electronically-accessible data 104 that had been associated with a pre-printed machine-readable graphical code. The user interface 1200 may be displayed to a user when the user wishes to update or change the electronically-accessible data 104 that is accessed when the pre-printed machine-readable graphical code is scanned. As discussed more fully above, the user may scan a pre-printed machine-readable graphical code that has been assigned to an object to cause the user interface 1200 to be presented to the user. The user is prompted through the user interface 1200 to change the electronically-accessible data associated with the reference identifier. A file name text field 1202 indicates the currently associated data 104. When the user interface 1200 is first brought up, the file name text field 1202 prints the file name of the currently associated data 104. In this embodiment, the user may simply type in the path to a new file name in the file name text field 1202.

The interface 1200 includes a browser window 1204 where a user may browse to the location of the new file. The browser window 1204 lists the available items 1205 in the current directory or folder. The available items 1205 are typically directories and/or files. A list box navigator 1206 may also be used to browse to the new file. Once the user has found or entered the new file, the user may click the select button 1208. If the user no longer desires to change the link, the user may click the cancel button 1210.

Those skilled in the art will appreciate the many different ways in which a user can be prompted to identify data. The interface 1200 of FIG. 12 identifies only one possible user interface 1200 that may be used to change the link to new electronically-accessible data 104 to associate with the pre-printed machine-readable graphical code.

The embodiments herein provide a convenient method of assigning reference identifiers to objects and associating them with electronic data. Ahead of time and in relatively large quantities, the reference identifiers may be generated, encoded into machine-readable graphical codes and printed onto labels. Assigning an identifier to an object may comprise sticking on one of the labels. Associating the object with electronically-accessible data may be achieved by scanning the graphical code (with a graphical code reader device) and selecting the data to be associated therewith. Once the data has been associated with the object or reference identifier, a user may easily access the electronically-accessible data by simply scanning the code or object.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for associating pre-printed machine-readable graphical codes with electronically-accessible data, the method comprising:

generating a sequence of reference identifiers;

generating machine-readable graphical codes for the sequence of reference identifiers;

printing labels that include the machine-readable graphical codes to provide pre-printed machine-readable graphical-code labels;

placing one of the pre-printed machine-readable graphical-code labels on an object;

scanning the pre-printed machine-readable graphical-code label;

receiving graphical code data from a graphical code reading device in electronic communication with a computing device;

determining a reference identifier of the graphical code data;

accessing a database to look up the reference identifier;

associating electronically-accessible data with the reference identifier by providing a user interface to associate electronically-accessible data with the reference identifier;

scanning the pre-printed machine-readable graphical-code label;

receiving the graphical code data from the graphical code reading device;

determining the reference identifier of the graphical code data;

accessing the database to look up the reference identifier; and accessing the electronically-accessible data identified by a data specifier associated with the reference identifier in the database.

2. The method as defined in claim 1 wherein the electronically-accessible data is associated with the reference identifier by providing to the user a chooser to select a file.

3. The method as defined in claim 1 wherein the electronically-accessible data is associated with the reference identifier by providing to the user a chooser to select a program.

4. The method as defined in claim 1 wherein the electronically-accessible data is associated with the reference identifier by providing to the user a chooser to select a program and program arguments.

5. The method as defined in claim 1 wherein the electronically-accessible data is associated with the reference identifier by providing to the user a field for entering a URL.

6. The method as defined in claim 1 wherein the electronically-accessible data is associated with the reference identifier by enabling the user to select a record in a database management system.

7. The method as defined in claim 1 wherein the electronically-accessible data is associated with the reference identifier by providing to the user a drag-and-drop interface.

8. The method as defined in claim 1 wherein the data specifier comprises a file.

9. The method as defined in claim 1 wherein the data specifier comprises a program.

10. The method as defined in claim 1 wherein the data specifier comprises a program and program arguments.

11. The method as defined in claim 1 wherein the data specifier comprises a database record identifier that specifies a record in a database system.

12. The method as defined in claim 1 wherein the data specifier comprises a database record identifier that specifies a database management system and a record in the database management system.

13. The method as defined in claim 1 wherein the data specifier comprises a URL.

14. The method as defined in claim 1 further comprising providing a change interface to a user whereby new electronically-accessible data is associated with the reference identifier to change the data specifier.

15. The method as defined in claim 1 wherein the reference identifier is unrelated to the electronically-accessible data.

16. The method as defined in claim 1 wherein the associating is dynamic.

17. The method as defined in claim 1 wherein the electronically-accessible data is stored on the computing device.

18. The method as defined in claim 1 wherein the electronically-accessible data is stored remotely from the computing device.

19. The method as defined in claim 1 further comprising creating the electronically-accessible data when the electronically-accessible data is associated with the reference identifier.

20. The method as defined in claim 1 wherein the electronically-accessible data is a record in a database management system.

21. The method as defined in claim 1 wherein the electronically-accessible data is an electronic document.

* * * * *